US007761467B2

(12) United States Patent
Xu et al.

(10) Patent No.: US 7,761,467 B2
(45) Date of Patent: Jul. 20, 2010

(54) METHOD AND A SYSTEM FOR CERTIFICATE REVOCATION LIST CONSOLIDATION AND ACCESS

(75) Inventors: Jing Min Xu, Beijing (CN); Zhong Tian, Beijing (CN); Leo Y Liu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1813 days.

(21) Appl. No.: 09/754,813

(22) Filed: Jan. 4, 2001

(65) Prior Publication Data

US 2002/0004773 A1 Jan. 10, 2002

(30) Foreign Application Priority Data

Jan. 7, 2000 (CN) ................................ 00 1 00915

(51) Int. Cl.
G06F 17/30 (2006.01)
(52) U.S. Cl. .................... 707/781; 709/203; 709/219
(58) Field of Classification Search .................. 707/1, 707/10; 713/156, 158, 155, 168
See application file for complete search history.

(56) References Cited

U.S. PATENT DOCUMENTS

| | | | | | |
|---|---|---|---|---|---|
| 5,903,882 | A | * | 5/1999 | Asay et al. .................... 707/9 |
| 6,028,938 | A | * | 2/2000 | Malkin et al. ................ 713/176 |
| 6,044,462 | A | * | 3/2000 | Zubeldia et al. ............. 713/158 |
| 6,092,201 | A | * | 7/2000 | Turnbull et al. ............. 713/201 |
| 6,128,740 | A | * | 10/2000 | Curry et al. ................. 713/200 |
| 6,134,551 | A | * | 10/2000 | Aucsmith ..................... 707/10 |
| 6,304,882 | B1 | * | 10/2001 | Strellis et al. .............. 707/202 |
| 6,308,277 | B1 | * | 10/2001 | Vaeth et al. ................. 713/156 |
| 6,411,956 | B1 | * | 6/2002 | Ng .............................. 707/10 |
| 6,442,689 | B1 | * | 8/2002 | Kocher ....................... 713/158 |
| 6,564,219 | B1 | * | 5/2003 | Lee et al. ..................... 707/100 |
| 6,658,568 | B1 | * | 12/2003 | Ginter et al. ................ 713/193 |

OTHER PUBLICATIONS

Hassler, Vesna; "X.500 and LDAP secrity: a comparative overview", Nov.-Dec. 1999, Network, IEEE, vol. 13 Issue: 6, pp. 54-64.*
Kaliski, B.; "Privacy Enhancement for Internet Electronic Mail: Part IV: Key Certification and Related Services", RFC 1424, Feb. 1993, pp. 1-8.*

(Continued)

*Primary Examiner*—Leslie Wong
(74) *Attorney, Agent, or Firm*—Ido Tuchman; Kenneth R. Corsello

(57) ABSTRACT

Methods and systems are provided for certificate revocation list (CRL) consolidation and access. A plurality of certificate authorities (CAs); a plurality of CRL retrieval agents associated with CRL distribution mechanisms of CAs, for consolidating the CRLs from multiple CAs; CRL databases, for storing the consolidated CRLs from multiple CRL retrieval agents and the replication of CRLs; and CRL access API. Therefore, an application can access the nearest CRL database to determine whether a digital certificate has been revoked via a set of unified APIs without bothering the detailed of CRL distribution mechanisms. In addition, the system of the invention is also adapted for consolidating and accessing all kinds of black lists.

20 Claims, 6 Drawing Sheets

OTHER PUBLICATIONS

Jadoul, M.; Chantrain, D.; Wuidart, A.-I.; De Smit, S.; "Access to an X.500 directory service via ADSI screen phones", Global Telecommunications Conference, 1997. GLOBECOM '97., IEEE, vol. 3, Nov. 3-8, 1997 pp. 1740-1744 vol. 3.*

Vesna Hassler, "X.500 and LDAP security: a comparative overview", Network, IEEE, vol. 13 Issue: 6, Nov.-Dec. 1999, pp. 54-64.*

Kaliski, B; "Privacy Enhancement for Internet Electronic Mail: Part IV: Key Certification and Related Services", RFC 1424, Feb. 1993, pp. 1-8.*

* cited by examiner

METHOD AND A SYSTEM FOR CERTIFICATE REVOCATION LIST CONSOLIDATION AND ACCESS

FIELD OF THE INVENTION

This invention relates to digital certificates, and, more particularly, to certificate revocation list consolidation and access.

BACKGROUND OF THE INVENTION

Systems for accomplishing business transactions electronically are becoming increasingly widespread, partly because of the advent of global computer networks such as the Internet, and partly because of the evolution and maturity of public key cryptography, which enhances the security of such commerce. The application of public key cryptography to electronic commerce has been heretofore envisioned in documents such as Recommendation X.509 of the International Telecommunications Union (ITU, formerly CCITT).

To use secure electronic commerce according to the conventional methods, each user has a pair of related keys, namely a private key and a public key. A public key is simply a value (generally a number), and has no intrinsic association with anyone, including the person whose message it is to authenticate. Widespread, commercial use of digital signatures requires reliable information associating public keys with identified persons. Messages of those identified persons can then be authenticated using the keys.

Digital signature certificates meet this need. These certificates are generally issued by trusted third parties known as certification authorities (CAs) and they certify (1) that the issuing certification authority has identified the subject of the certificate (often according to specifications delineated in a certification practice statement), and (2) that a specified public key (in the certificate) corresponds to the a private key held by the subject of the certificate. A structure for public-key certificates is included in the X.509 standard cited earlier. The content of a certificate is often specified in a statute or regulation. A typical X.509 certificate has the format:

| X.509 Certificate |
| --- |
| Version Number |
| Certificate Serial Number |
| Algorithm Identifier |
| Certificate Issuer |
| Validity Period |
| Subscriber |
| Subscriber's public key information |
| Signature of Issuer |

Generally, a valid term is specified in the certificate. The certificates become invalid for its expiration. In addition, the invalid certificates may include any certificate which:

(1) has been revoked (i.e., have been declared permanently invalid by the certification authority which issued the certificate); and
(2) is suspended at the time of reliance (i.e. has been declared temporarily invalid by the certification authority which issued the certificate).

Suspending and/or revoking certificates are an important means of minimizing the consequences of errors by the certification authority or subscriber. Depending on applicable legal rules, a certification authority may avert further loss due to inaccuracy in the certificate by revoking it. A subscriber can revoke a certificate to prevent reliance on forged digital signatures created using a compromised, e.g., lost or stolen, private key. Certificates which become invalid by revocation are generally listed in a certificate revocation list (CRL), according to ITU X.509. Suspension, or temporary invalidation, was not contemplated in ITU X.509, and may or may not be included in the CRL. Certificates which become invalid by virtue of their age need not be listed in a CRL because each certificate contains its own expiration date.

As a practical matter, the conventional CRL-based system works as follows. Before a subscriber can create a verifiable digital signature, the signer must arrange for a certification authority to issue a certificate identifying the subscriber with the subscriber's public key. The subscriber receives back and accepts the issued certificate, and then creates digital signatures and attaches a copy of the certificate to each of them. When the other party to a transaction receives such a digital signature, the other party must check with the certification authority, generally via its on-line database, to determine whether the certificate is currently valid. If so, and if the digital signature can be verified by the public key in the certificate, the party is usually in a strong position to rely on the digital signature.

Modern e-business typically work or will work on the open Internet and need to access CRLs from multiple CAs as users may use any existing CAs of their choice. But different CAs may use different CRL distribution mechanisms, some of which are very complicated. This demands that the application developers have rich knowledge of these CRL distribution mechanisms. In addition, some CAs may change their CRL distribution mechanisms from time to time, which may impose significant change on the way in which applications can access their CRL.

Further, CRL online distribution, such as via a directory server, is adopted by some CAs. An application can down load these CRLs when needed. But real time access to CRL may be very expensive and not necessary for most application. In addition, the CRLs downloaded and parsed by one application can't be shared by others, which is also a waste of system resources.

SUMMARY OF THE INVENTION

In order to solve the above problems, this invention provides methods and systems for certificate revocation list consolidation and access. This invention uses different CRL retrieval agents for different CRL distribution methods to consolidate CRLs from multiple CAs into a central CRL database, which can be replicated to other machines via network. An application can access the nearest CRL database to determine whether a digital certificate has been revoked via a set of unified APIs without bothering the details of CRL distribution, retrieval and representation. In addition, since the CRL database can be shared by all the applications, the system resources is used efficiently.

According to an aspect of the invention, a system for certificate revocation list consolidation and access is provided. In an example embodiment the system comprises:

a plurality of certificate authorities (CAs), in which each CA maintains and distributes the digital certificates revoked by itself in the form of CRL, and different CAs may use different CRL distribution mechanisms;

a plurality of CRL databases, for storing the consolidated CRLs from multiple CRL retrieval agents or the replications of CRLs; and CRL access user interface, for providing a uniform set of APIs for user's accessing the CRLs CRL databases.

According to another aspect of the invention, a method for certificate revocation list (CRL) consolidation and access is provided, wherein a plurality of certificate authorities (CAs) maintain and distribute the digital certificates revoked by themselves in the form of CRLs, and different CAs may use different CRL distribution mechanisms, said method comprising the steps of:

creating a plurality of CRL retrieval agents based on the CRL distribution mechanisms of CAs, for consolidating the CRLs from multiple CAs;

storing the consolidated CRLs from multiple CRL retrieval agents or the replications of CRLs into a plurality of CRL databases; and accessing the CRLs from the CRL databases by a uniform set of APIs.

BRIEF DESCRIPTION OF THE DRAWINGS

Additional objects and advantages of this invention will be apparent from the following detailed description of preferred embodiments thereof which proceeds with reference to the accompanying drawings, in which.

DESCRIPTION OF THE INVENTION

Figure 1:
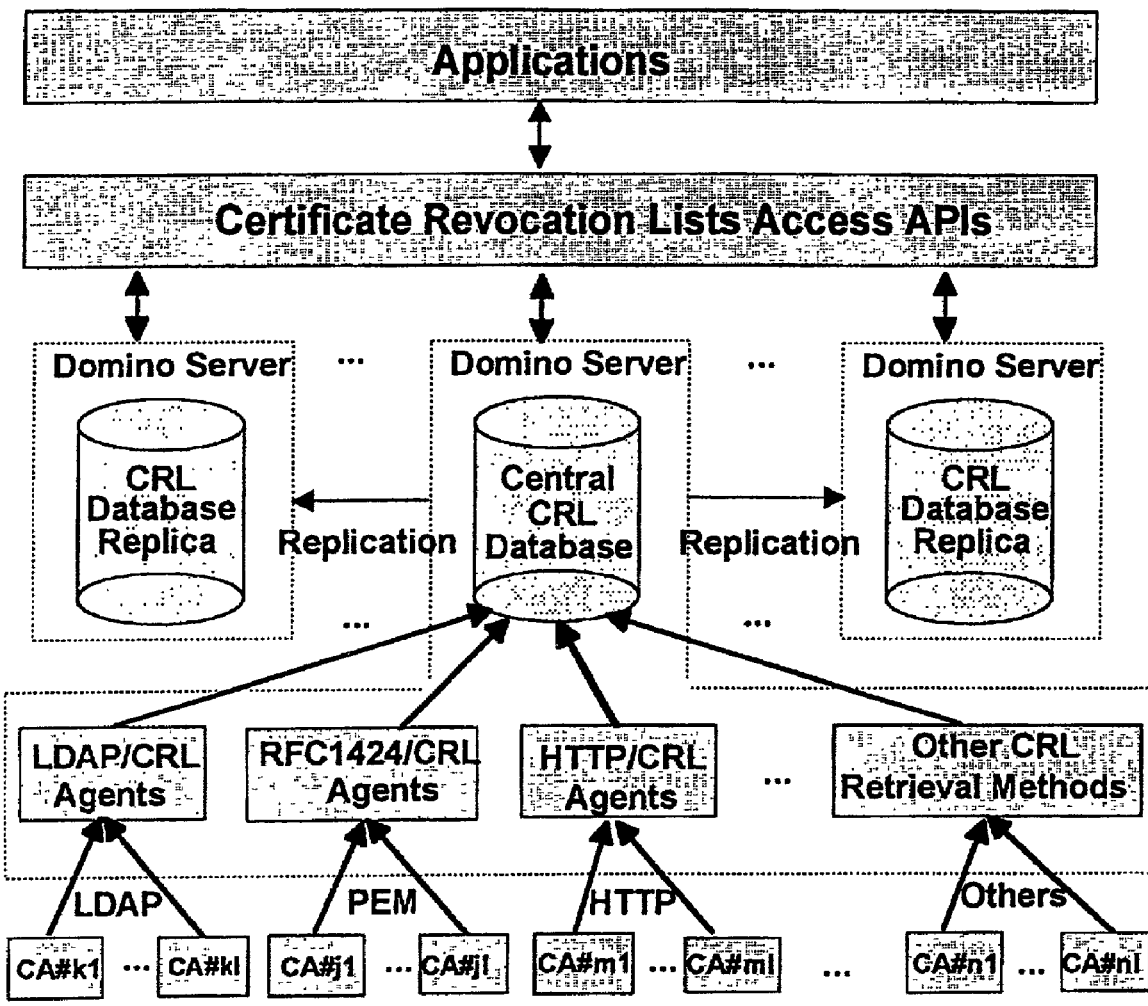
FIG. 1 is a block diagram illustrating the system for certificate revocation list consolidation and access according to a preferred embodiment of this invention.

Before describing the preferred embodiment of this invention, first we describe the general problem of the certificate revocation list consolidation, such as, the format of CRLs, the distribution mechanism of CRLs, etc.

As described in the above, Digital Certificate is a digital document attesting that a particular public key belongs to a particular entity. The most widely accepted format for certificates is defined by the ITU-T X.509 international standard. A Digital Certificate:

is digitally signed by some trusted entity called Certificate Authority (CA);
is valid only within a certain designated period of time;
can be verified by anyone having access to its signing CA's public key; and
is labeled with a unique serial number for identifying it within its issuing CA.

However, a digital certificate may have been revoked for some reason within the validity period of the digital certificate. Hence, each CA has the obligation to maintain a Certificate Revocation List (CRL), make it publicly available and refresh it in certain time intervals. Each revoked digital certificate included in a CRL can be identified by its serial number.

X.509 CRL is defined as an ASN.1 SEQUENCE structure as below,

```
CertificateList ::= SEQUENCE{
    tbsCertList         TBSCertList,
    signatureAlgorithm  AlgorithmIdentifier,
    signature           BIT STRING
}
``` where signatureAlgorithm identifies the algorithm used by the signing CA for computing the digital signature from the ASN.1 DER encoded TBSCertList structure, which itself is also expressed in an ASN.1 SEQUENCE structure as specified below.

```
TBSCertList ::= SEQUENCE{
    version             Version OPTIONAL,
    signature           AlgorithmIdentifier,
    issuer              Name,
    thisUpdate              Time,
    nextUpdate              Time OPTIONAL,
    revokedCertificates SEQUENCE OF SEQUENCE{
        userCertificate     CertificateSerialNumber,
        revocationDate      Date,
        crlEntryExtension   Extensions OPTIONAL
    }OPTIONAL
    crlExtensions [0]   EXPLICIT Extensions OPTIONAL
}
```

The TBSCertList specifies the distinguished name of the issuer, the issuing date of the CRL, the date when the next CRL will be issued, and, optionally, lists of revoked digital certificates (identified by their serial numbers) and CRL extensions.

Two points should be noted here. First of all, the list of revoked digital certificates is optional because a particular CA might not have revoked any certificates it has issued so far when its CRL publication is due. Secondly, although a CA might specify in its CRL the next scheduled publication date of CRL, this does not prevent the CA from publishing its CRL on a more frequent basis, e.g., in case of emergency. Nevertheless, this optional nextUpdate convention enables users to get a sense when a given CRL is "out of date".

Generally, there are two models for a CA to distribute its CRL. In the "pull" model, verifiers (users who want to verify the status of certain digital certificate(s)) can download the CRL from the CA when needed. In the "push" model, the CA sends the CRL to the registered verifiers at regular intervals.

The authentication framework defined by X.509 is originally designed to operate in the X.500 directory environment. X.500 makes provision for the storage of CRL's as directory attributes associated with CA entries. X.500 also defines the DAP (Directory Access Protocol) used by clients to access the directory. However, DAP is significantly more complicated than the more prevalent TCP/IP stack implementations and requires more coding and computing horsepower to run. The size and complexity of DAP make it difficult to run on smaller machines such as the PC's. LDAP (Lightweight Directory Access Protocol) is designed to remove some of the burden of X.500 access from directory client, making the directory available to a wider variety of machines and applications. LDAP runs directly over TCP/IP (or other reliable transport)

implementations bundled with most modern machines today. Verifiers can use the "pull" model to retrieve CRL's from LDAP servers.

However, X.500 directory service is not expected to be ubiquitous on the Internet in the near future. Some other affordable CRL distribution and access methods using existing Internet infrastructure are developed to address the needs today. One such method is defined in Privacy-Enhanced Mail. According to Privacy-Enhanced Mail, Internet Policy Registration Authority (IPRA) should coordinate with Policy Certification Authorities (PCA's) to provide a robust database facility which contains CRL's issued by the IPRA, by PCA's, and by all other CA's. Access to this database is provided through mailbox facilities maintained by each PCA. The verifiers can retrieve CRL's from their specified one or more e-mail addresses using the mechanisms defined in RFC1424. The CRL retrieval methods works either in "pull model or in "push model, depending on whether or not the PCA's concerned support unsolicited distribution of CRL's.

In the above, the general problem of the certificate revocation list consolidation, such as, the format of CRLs and the distribution mechanism of CRL have been discussed. Now, the system and the method for certificate revocation list consolidation and access will be disclosed with reference to the accompanying drawings.

In the system of this invention, the central CRL database is created for the storage of consolidated CRLs. For different CRL distribution method, different CRL retrieval agents are used to retrieve periodically CRL's from different CAs and consolidate them into the central CRL database. A set of unified API's is provided for online applications to access CRL information.

FIG. 1 shows our Lotus Domino based framework of CRL accessing middleware. Three CRL retrieval methods are supported at this time, while more CRL retrieval methods can be integrated with relative ease. The revoked certificates are extracted from the retrieved CRL's and are stored in a Domino database called Central CRL Database, which is to be replicated to other databases called CRL Database Replica on other connected Domino servers. A set of Java based CRL access API's are also provided for e-Commerce applications to actually take advantage of the consolidated CRL's at the nearest Domino server, without bothering the details of how the CRL's are issued by various CA's.

Although different CA's may use different CRL retrieval methods, all such methods must include processes to download CRL's from specified locations, to verify downloaded CRL so as to ensure it is indeed issued by the intended CA, and to save the downloaded CRL to a central CRL database. As one example in our case, a specific CA puts its CRL in a LDAP directory, a Domino Agent residing in the central CRL database is scheduled to run periodically to retrieve CRL from the designated LDAP server via LDAP protocol and update the central database accordingly. Any change in the central CRL database will be replicated to other CRL database replica. This not only makes the CRL database management easier but also enables an e-Commerce application to have easier, faster, and less costly access to CRL database. When an e-Commerce application wants to determine whether a certificate has been revoked, they only need to make a CRL access API call to the nearest CRL Database Replica. The CRL access API then calls NOI (Notes Object Interface) to access the Domino CRL database, ascertain whether the certificate is listed in the CRL and return the result to the e-Commerce application.

1. The Central CRL Database

The CRL Database bases its design on a CRL Database template, which comprise a number of forms, views, and agents described below.

Domino Forms for CRL Database

The CRL Database contains documents created from three forms: a Trusted Certificate Authority form, a Revoked Certificate form and a Memo form. The Trusted Certificate Authority form mainly includes the fields presented in table 1.

The DistinguishedName field represents the distinguished name of a CA conforming to RFC 1779, which defines a user-oriented string representation of distinguished name. The Certificate field holds the CA's X.509 v3 certificate that is in Base64 encoded DER format. The certificate is used to

TABLE 1

Trusted Certificate Authority Form Definition

| Field Name | Stored Data |
|---|---|
| DistinguishedName | Distinguished Name of a CA conforming to RFC 1779[6] |
| Certificate | X.509 Certificate of a CA |
| ThisUpdate | the last time when a CA updated its CRL |
| NextUpdate | the next time when a CA is to update its CRL |
| CRLNumber | the current CRL sequence number of a CA |
| LDAPURL | a LDAP URL conforming to RFC 2255[7] |
| PCAMailbox | e-mail address of a PCA for RFC 1424 CRL service | verify certificates and CRL's signed by this CA. To avoid input errors, the source of this field can be from the Clipboard or from a local certificate file. The ThisUpdate, NextUpdate and CRLNumber fields get their values from the latest retrieved CRL. The NextUpdate and CRLNumber fields may be empty. The CRLNumber is a CRL extension conveying a monotomically increasing sequence number for each CRL issued by a given CA. This extension allows users to easily determine whether a particular CRL supersedes another CRL. The LDAPURL field contains a LDAP URL conforming to RFC 2255 [7], which is used by the LDAPRetriever Agent to retrieve CRL from the specified LDAP server. The PCAMailbox field contains the e-mail address of the CA's PCA for RFC 1424 CRL service. If the PCA supports unsolicited CRL distribution, this field may be empty.

Each revoked certificate extracted from the retrieved CRL is stored in a document created from the Revoked Certificate form that mainly includes the following fields.

TABLE 2

Revoked Certificates Form Definition

| Field | Stored Data |
|---|---|
| Distinguished Name | Distinguished Name for a CA conforming to RFC 1779 |
| Serial Number | serial number of a revoked certificate |
| Revoke Date | date when a certificate is revoked |
| Revocation Reason | reason for revoking a certificate |

All fields, except for the RevocationReason, in the RevokedCertificate fields are mandatory. The DistinguishedName field and the SerialNumber field unequivocally identify a revoked certificate. The RevocationReason field describes a CRL entry extension reasonCode, which is used to identify the reason for revoking a certificate.

The Memo form is for the RFC1424 PEM messages. The form mainly includes the following fields.

| Field | Stored Data |
|---|---|
| From | e-mail address of PEM message sender |
| To | e-mail address of PEM message receiver |
| Date | PEM Message sent date |
| Subject | PEM Message subject |
| Body | PEM message body |

Domino Views for CRL Database

Three views, a Trusted Certificate Authorities view and a Revoked Certificates\By Issuer view and a Revoked Certificates\By Serial Number view, are created in this Domino database in order to speed up searching for a particular CA and/or revoked certificate.

The Trusted Certificates Authorities view has columns titled Distinguished Name, Current CRL Update Time, Next CRL Update Time and Current CRL Number, which get their values from the corresponding fields of every Trusted Certificate Authority document. In these columns, Distinguished Name is the auto-sorted column.

The Revoked Certificates\By Issuer view has columns titled Distinguished Name, Serial Number, Revoked Date and Revocation Reason, which get their values from the corresponding fields of every Revoked Certificate document. In these columns, Distinguished Name is the primary sorting column and Serial Number is the secondary sorting column. In addition, Distinguished Name is also the Categorized column.

The Revoked Certificates\By Serial Number view has the same titled columns with the Revoked Certificate\By Issuer view, but in a different order, Serial Number, Distinguished Name, Revoked Date and Revocation Reason. In these columns, Serial Number is the primary sorting column and Distinguished Name is the secondary sorting column.

The Domino Agents

The CRL Database also has the following Java Domino agents named LDAP Retriever, HTTP Retriever, RFC1424 Requester, RFC1424 Receiver and HttpReceiver, respectively. The LDAP Retriever Agent, HTTP Retriever agent and RFC1424 Requester Agent are background agents, the former periodically retrieves CRL's of trusted CA's from LDAP servers or X.500-LDAP gateways and stores them in the CRL Database, the latter sends RFC1424 CRL retrieval request messages to PCA mailboxes in certain time interval. The RFC1424Receiver Agent is activated when new mail has arrived, then it retrieves CRL's from the received mail and stores them in the CRL Database. The HttpReceiver Agent is triggered by a HTTP request. It verifies the authorization of the requester. If successful, the agent stores the transmitted CRL in the CRL Database, so the HTTP task must be running in the hosting Domino server. This agent provides a convenient way to incorporate other external CRL retrieval methods, which only need to transmit the CRL's they have received in a HTTP POST message as below:

POST/X509CRL.nsf/HttpReceiver?OpenAgent HTTP/1.0
Content-length: <content length>
Content-type: application/pkix-crl
Content-transfer-encoding: base64
<base64 Encoded CRL>

However, the LDAPRetriever Agent is an unrestricted agent as it will perform network I/O operations, so you might have to modify the server record in the public Name and Address book to enable the agent to run on the server.

2. LDAP Retriever Agent

Figure 2:
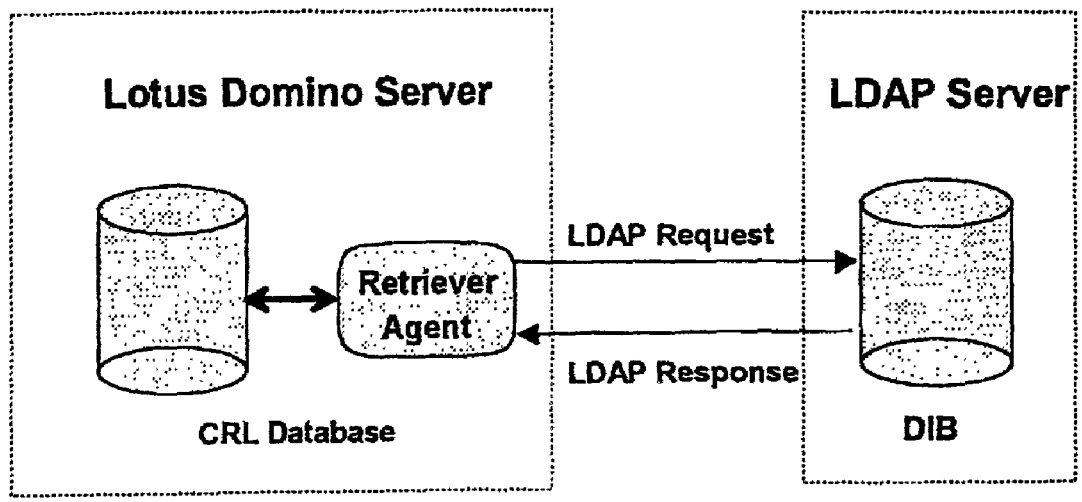
FIG. 2 illustrates the operation of LDAP/CRL retriever agent according to a preferred embodiment of this invention.

As shown in FIG. 2, the LDAP Retriever Agent connects to LDAP servers to retrieve CRL and update the CRL Database accordingly.

Currently, there are two Java interfaces to LDAP, JDAP and JNDI. JDAP is an LDAP class library defined in an IETF draft [8]. JDAP is supported in Netscape Directory SDK for Java. Java Naming and Directory Interface (JNDI) is part of the Java Enterprise API set, supported by many vendors including IBM, HP, Novell etc. However, our discussion below is neutral to either API.

LDAP servers may require a bind operation to authenticate client identity before any other LDAP operations. In the normal case, the CRL attribute of a CA entry is publicly available, hence anonymous bind operation is good enough. LDAP V2 clients have to send a Bind Request in the first Protocol Data Unit(PDU) of the connection, while LDAP V3 clients do not need to perform bind operation, since LDAP V3 servers automatically treat operations without prior binding as anonymous operations [3]. In order to keep compatibility with LDAP V2 server, we always request an anonymous bind operation prior to performing any other LDAP operations.

After the bind operation, the LDAP Retriever Agent uses the specified LDAP URL to get the CA's latest CRL from the LDAP server. And then, the LDAP Retriever Agent updates the CRL Database with the retrieved CRL.

3. HTTP Retriever Agent

The operation of HTTP retriever agent is similar to the operation of LDAP retriever agent. As seen from FIG. 3, HTTP retriever agent retrieves periodically CRL's from CAs.

4. RFC1424 Retriever Agent

As we discussed in the above 3, RFC1424 CRL retrieval service is provided through mailboxes maintained by each CA's PCA. If you want to get a CA's latest CRL, you need to register with the PCA or send a CRL-retrieval request to the PCA's mailbox. The PCA will send you a CRL-retrieval reply message containing the requested CRL. Both CRL-retrieval request message and CRL-retrieval reply message are a type of Privacy-Enhanced Message(PEM). So you must have a mailbox and a PEM user agent to send CRL-retrieval request messages and to receive CRL-retrieval reply messages.

Figure 3:
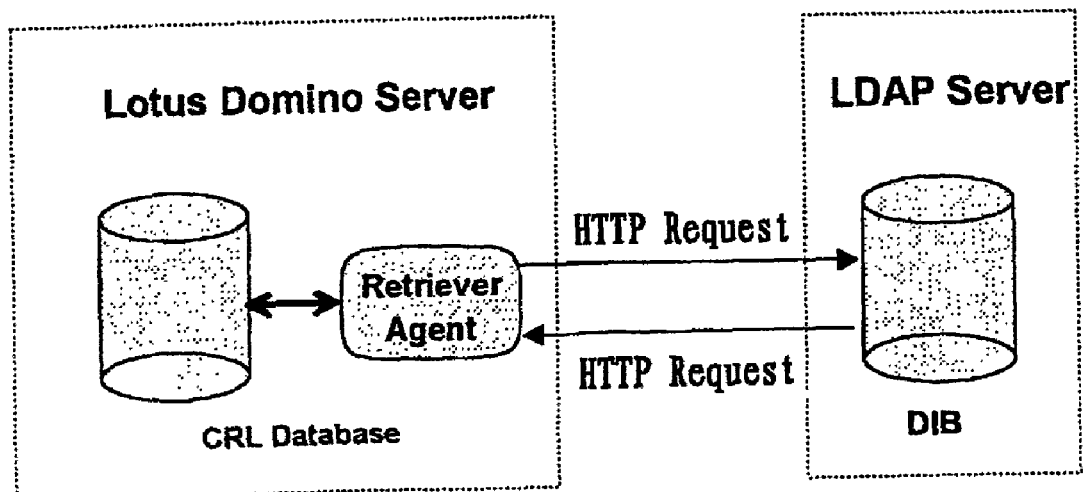
FIG. 3 illustrates the operation of HTTP/CRL retriever agent according to a preferred embodiment of this invention.

Domino Mail-In database record within the public Name and Address book provides a means of receiving e-mails directly into a Notes application, which is generally referred to as mail enabled application. The Central CRL Database is such a mail enabled application. As discussed in section 2.2.3, two agents residing in the CRL database, RFC1424 Receiver and RFC1424 Requester, fulfill the task of accessing RFC1424 CRL service. The FIG. 3 depicts this.

If the PCA's support unsolicited CRL distribution, i.e., when the latest CRL's are available, the PCA's automatically send the CRL-retrieval reply messages to your mailbox, the scheduling of the RFC1424 Requester Agent may be disabled.

The RFC1424 Requestor Agent listens for incoming CRL retrieval reply messages, verifies the retrieved CRL's and stores them in the CRL Database.

Since PCA usually uses standard Internet mail address, the hosting Domino Server for CRL Database must be able to exchange e-mail messages with the Internet e-mail servers.

5. Http Receiver Agent

Figure 5:
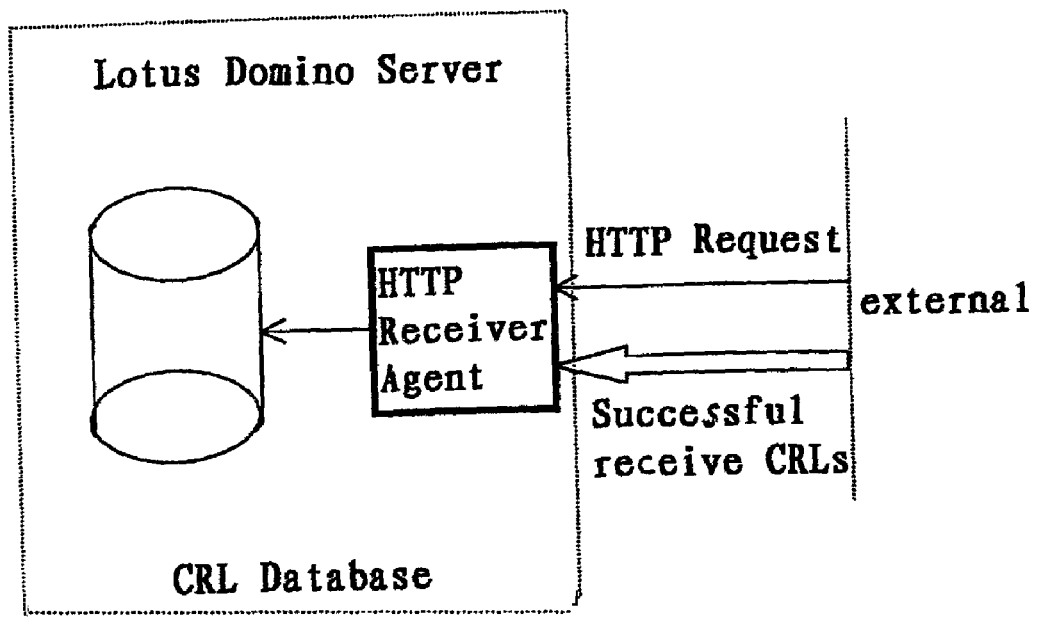
FIG. 5 illustrates the operation of Http receiver agent according to a preferred embodiment of this invention.

As shown in from FIG. 5, Http receiver agent is triggered by HTTP request. The Http receiver agent verifies the request, if successful, stores CRL sent by them in the CRL Database.

6. CRL Database Replication

To distribute the CRL Database over the entire Notes network, we make use of the Notes database replication functionality to replicate the CRL Database to other Domino server. e-Commerce applications can have easier, faster and less costly access to CRL from the nearest (even local, in some cases) CRL Database Replica.

Figure 4:
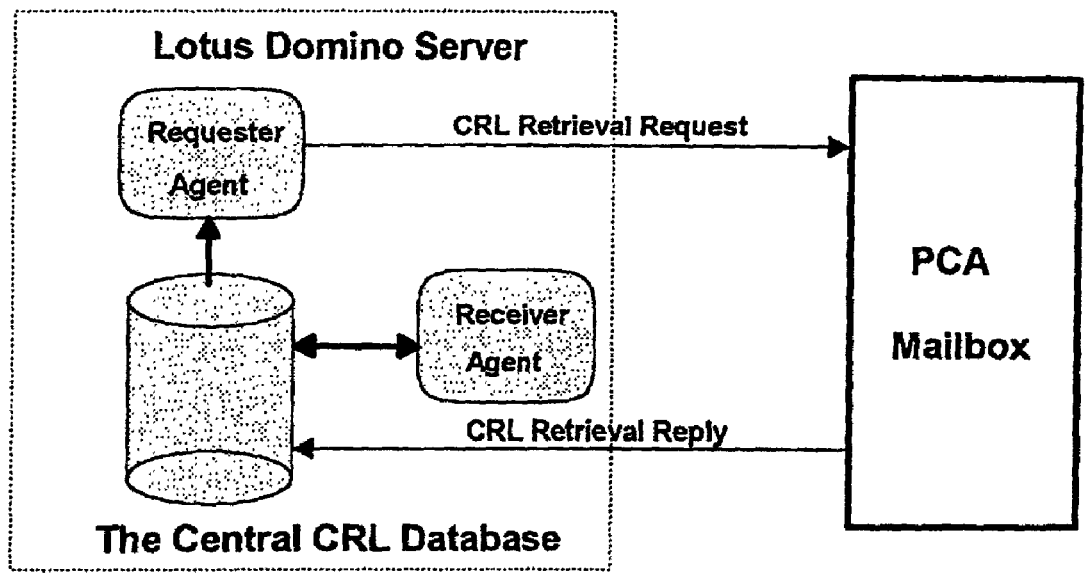
FIG. 4 illustrates the operation of RFC 1424/CRL retriever agent according to a preferred embodiment of this invention.
Figure 6:
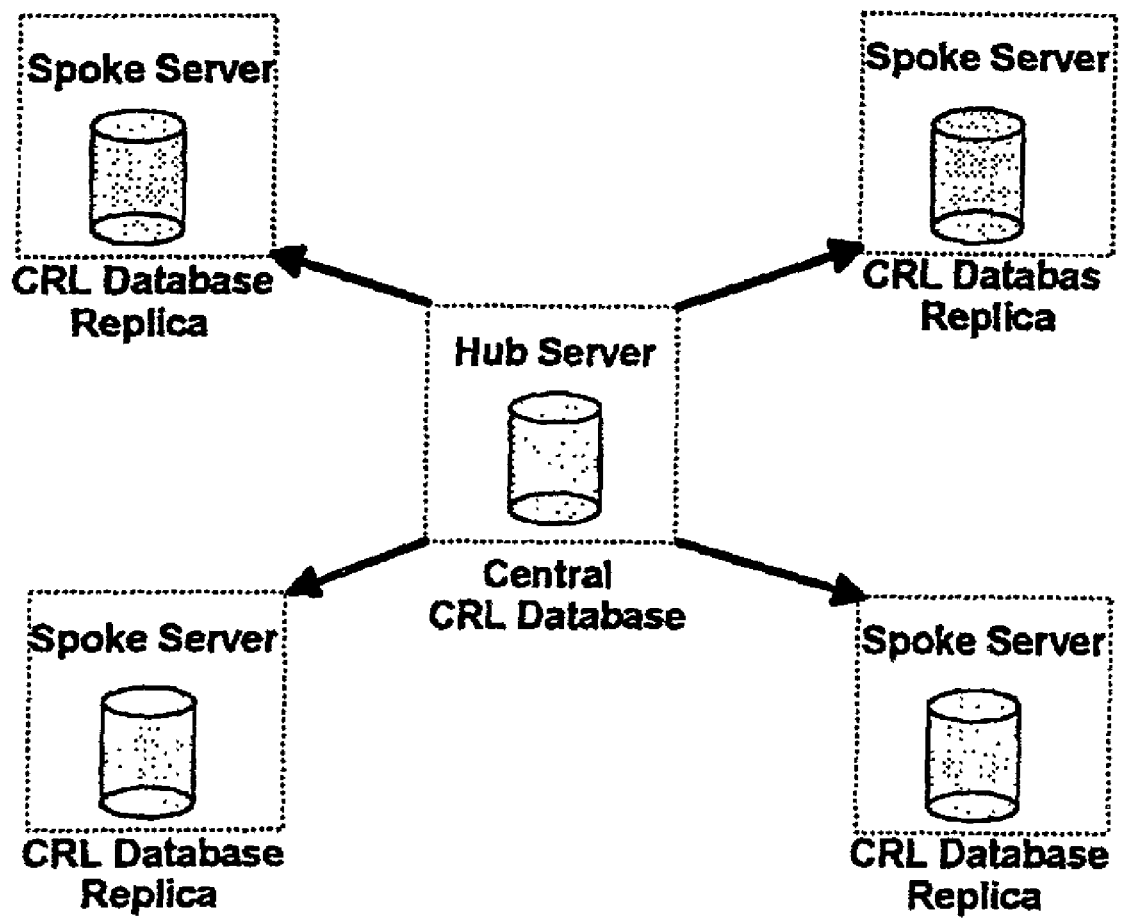
FIG. 6 illustrates the architecture of the CRL database replication.

As shown in FIG. 6, the Hub-and-Spoke replication architecture is set up to fulfill replication task, as shown in FIG. 4. The hub server is responsible for, retrieving the latest CRL's from all trusted CA's
updating the local CRL Database
propagating the update to the spoke servers Although you can specify what replication types should be specified: Pull-Push, Pull-Pull, Push-Only and Pull-Only, it is apparent that Push-Only or Pull-Only type is appropriate for the situation, because there is no change needed to propagate from the spoke servers to the hub server. Specify Push-Only or Pull-Only only affects which server initiates the replication work: either the hub server pushes or the spoke servers pull. Only the replication connection records and the database ACL need to be modified accordingly.

For each spoke server, a replication connection record must be created in the public Name and Address book. In all of these records, if the Replication Type field in Routing and Replication section is set to Push-Only, the Source server field and Destination server field in Basics section should be specified as hub server and spoke server respectively. If the Replication Type field is set to Pull-Only, the source server must be specified as spoke server, the destination server must be specified as hub server.

For Push-Only model, the CRL Databases in the spoke servers must assign at least the Designer right to the hub server. However, for Pull-Only model, the CRL Database in the hub server only need to assign Reader right to the spoke servers. So the Pull-Only replication model can be recommended.

7. CRL Access API in Java

Our system not only retrieves and consolidates CRL's from multiple CA's, it also provides a set of Java CRL access API for e-Commerce applications. The API's are represented as a Java class CRLAccessAgent. The constructor of the CRL Access Agent class takes the name of the CRL Database as its arguments:

public CRLAccessAgent(String dbName);

After instantiation of a CRL Access Agent object, we can call the methods of this class to obtain the information on current CRL of a particular CA and check if a certificate has been revoked. For example:

```
CRLAccessAgent crlChecker;
crlChceker=new CRLAccessAgent(RevokedCert.nsf);
if(!crlChecker.isRevoked(a Digital Certificate)){
    System.out.println(The certificate is revoked!);
    return;
}
... ...
```

Because the CRL Access Agent class use Java classes for Notes Object Interface (NOI) to access the revoked certificate database, the notes.jar file must be added to the class path.

Figure 7:
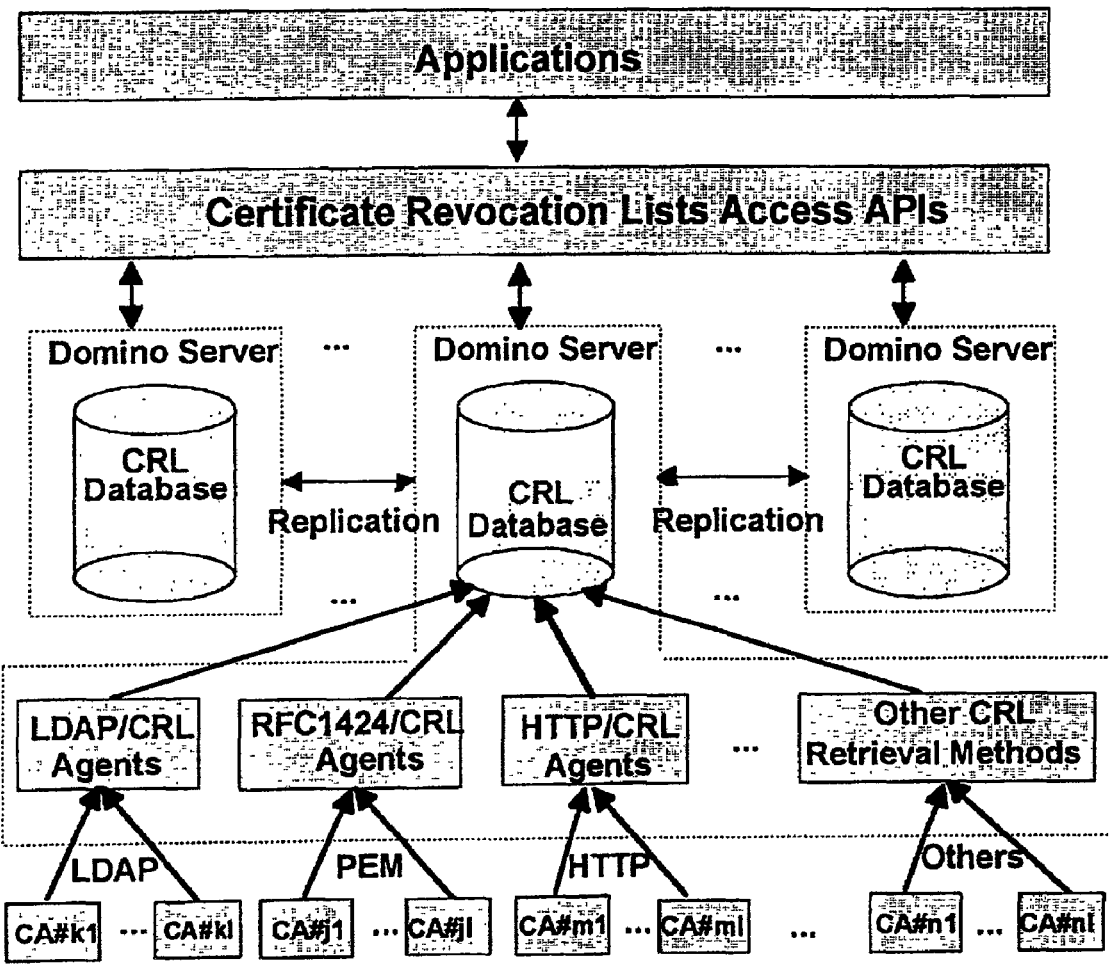
FIG. 7 is a block diagram illustrating the system for certificate revocation list consolidation and access according to another preferred embodiment of this invention.

FIG. 7 shows the system for certificate revocation list consolidation and access according to another preferred embodiment of this invention. As shown in the FIG. 7, all the CRL databases can receive CRLs from CRL retriever agents, and there does not exist the central database. In the meantime, in order to maintain the uniform of databases, each database can propagates the update to the other database. It is understood that modification and variation of the arrangement and the details described herein will be done by others skilled in the art.

Figure 8:
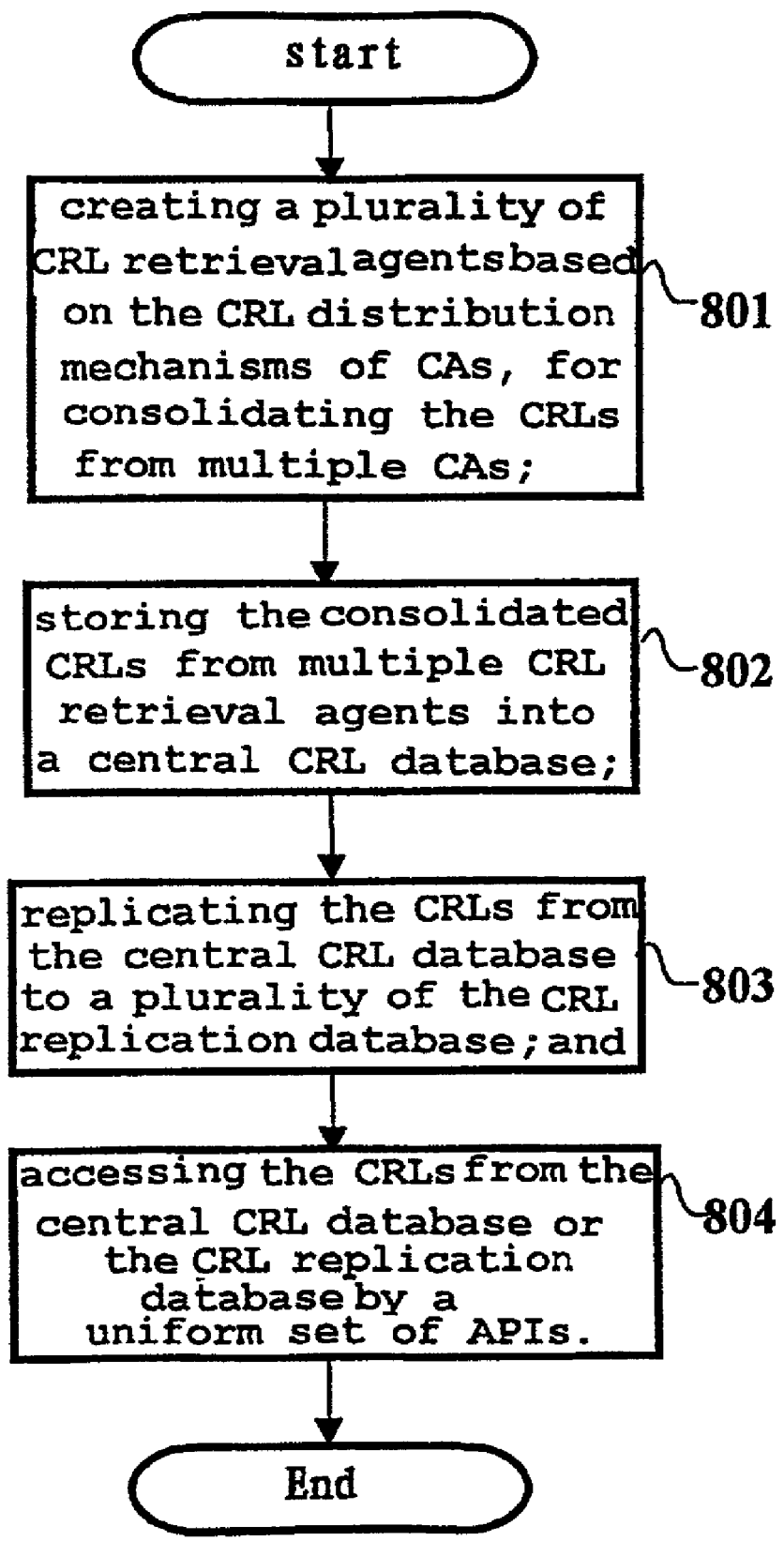
FIG. 8 is a flow diagram illustrating the system for certificate revocation list consolidation and access according to another preferred embodiment of this invention.

A method for certificate revocation list consolidation and access can be obtained from the above. As shown in FIG. 8, in a secure network implemented by digital certificates, a method for certificate revocation list (CRL) consolidation and access, wherein a plurality of certificate authorities (CAs) maintain and distribute the digital certificates revoked by themselves in the form of CRLs, and different CAs may use different CRL distribution mechanisms, said method comprising the steps of: creating a plurality of CRL retrieval agents based on the CRL distribution mechanisms of CAs, for consolidating the CRLs from multiple CAs (801); storing the consolidated CRLs from multiple CRL retrieval agents or the replications of CRLs into a plurality of CRL databases (802, 803); and accessing the CRLs from the CRL databases by a uniform set of APIs (804).

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Thus, for example, the CRL access mechanism described in the above, is independent from the CA's distribution method. Although we use Lotus Domino in the preferred embodiment, it is merely to illustrate the principles of the present invention. It is understood that modifications employing the concepts of the present invention will be apparent to others skilled in the art. Therefore, the invention is to be limited only by the claims.

What is claimed is:

1. A system comprising:
a plurality of certificate authorities (CAs) in which each CA maintains and distributes digital certificates revoked by itself in the form of a certificate revocation list (CRL), and different CAs may use different CRL distribution mechanisms;
multiple CRL retrieval agents configured to periodically retrieve CRLs at time intervals from different CAs based on the CRL distribution mechanisms of CAs;
a plurality of CRL databases for storing the consolidated CRLs from the multiple CRL retrieval agents and/or the replications of CRLs, the CRL databases storing at least one individually identifiable revoked digital certificate; and
a CRL access user interface for providing a uniform set of Application Program Interfaces for users accessing the CRLs in the CRL database, said system enabling consolidation and access of the certificate revocation lists (CRLs) from the plurality of certificate authorities (CAs).

2. A system according to claim 1, wherein said plurality of CRL databases include a central CRL database and a plurality of CRL replication databases, said central CRL database for storing the consolidated CRLs from the multiple CRL retrieval agents, and said plurality of CRL replication databases for storing the replications of the CRLs of the central CRL database.

3. A system according to claim 1, wherein said plurality of CRL retrieval agents include a LDAP/CRL retrieval agent, for periodically retrieving CRLs from specified LDAP servers and updating the CRL databases.

4. A system according to claim 1, wherein said plurality of CRL retrieval agents include a HTTP/CRL retrieval agent, for periodically retrieving CRLs from specified HTTP servers and updating the CRL database.

5. A system according to claim 1, wherein said plurality of CRL retrieval agents include a RFC1424/CRL retrieval agents, for periodically sending Request For Comments 1424/Certificate-Revocation List retrieval request and receiving CRL retrieval reply.

6. A system according to claim 1, wherein said plurality of CRL retrieval agents include a Http retrieval agent triggered by a HTTP request, said Http receiver agent verifies an authorization of the requester, if successful, said agent stores each transmitted CRL in the CRL databases.

7. A system according to claim 1, wherein said plurality of CRL retrieval agents further verifies the integrity and the authenticity of the retrieved CRLs.

8. A system according to claim 1, wherein a particular replication architecture is used among said plurality of CRL databases in order to maintain database consistency.

9. A system according to claim 2, wherein a hub-and-spoke replication architecture is used among said central CRL database and said plurality of CRL replication databases.

10. A system according to claim 1, wherein said system is also adapted for consolidating and accessing at least one kind of revoked certificate list.

11. In a secure network implemented by digital certificates, a method for certificate revocation list (CRL) consolidation and access, wherein a plurality of certificate authorities (CAs) maintain and distribute the digital certificates revoked by themselves in the form of CRLs, and different CAs may use different CRL distribution mechanisms, said method comprising the steps of:
periodically retrieving CRLs at time intervals from different CAs using a plurality of CRL retrieval agents based on the CRL distribution mechanisms of CAs;
consolidating the CRLs from multiple CAs;
storing the consolidated CRLs from multiple CRL retrieval agents or the replications of CRLs into a plurality of CRL databases, the consolidated CRLs including at least one individually identifiable revoked digital certificate; and
accessing the CRLs from the CRL databases by a uniform set of Application Program Interfaces.

12. A method according to claim 11, said plurality of CRL databases include a central CRL database and a plurality of CRL replication database, said central CRL database for storing the consolidated CRLs from multiple CRL retrieval agents and said plurality of CRL replication database for storing the replications of the CRLs of the central database.

13. A method according to claim 11, wherein said method is also adapted for consolidation and accessing all kinds of revoked certificate lists.

14. An article of manufacture comprising a computer usable medium having computer readable program code means embodied therein for causing certificate revocation list (CRL) consolidation and access, the computer readable program code means in said article of manufacture comprising computer readable program code means for causing a computer to effect the steps of claim 11.

15. A computer program product comprising a computer usable medium having computer readable program code means embodied therein for causing certificate revocation list (CRL) consolidation and access, the computer readable program code means in said computer program product comprising computer readable program code means for causing a computer to effect the steps of claim 11.

16. A program storage device readable by machine, tangibly embodying a program of instructions executable by the machine to perform method steps for certificate revocation list (CRL) consolidation and access, said method steps comprising the steps of claim 11.

17. A method comprising:
employing a secure network implemented by digital certificates for certificate revocation list (CRL) consolidation and access, with a plurality of certificate authorities (CAs) maintaining and distributing the digital certificates revoked by themselves in the form of CRLs, wherein different CAs may use different CRL distribution mechanisms, including the steps of:
creating a plurality of CRL retrieval agents based on the CRL distribution mechanisms of CAs, the retrieval agents configured to periodically retrieve CRLs at time intervals from the different CAs and to consolidate the CRLs from multiple CAs;
storing the consolidated CRLs from multiple CRL retrieval agents or the replications of CRLs into a plurality of CRL databases, the consolidated CRLs including at least one individually identifiable revoked digital certificate; and
accessing the CRLs form the CRL databases by a uniform set of Application Program Interfaces.

18. A program storage device readable by machine, tangibly embodying a program of instructions executable by the machine to perform method steps for certificate revocation list (CRL) consolidation and access, said method steps comprising the steps of claim 17.

19. An article of manufacture comprising a computer usable medium having computer readable program code means embodied therein for causing certificate revocation list (CRL) consolidation and access, the computer readable program code means in said article of manufacture comprising computer readable program code means for causing a computer to effect the steps of claim 17.

20. A computer program product comprising a computer usable medium having computer readable program code means embodied therein for causing certificate revocation list (CRL) consolidation and access, the computer readable program code means in said computer program product comprising computer readable program code means for causing a computer to effect the steps of claim 17.

\* \* \* \* \*